(12) United States Patent
Mueller et al.

(10) Patent No.: US 11,885,407 B1
(45) Date of Patent: Jan. 30, 2024

(54) FLUID SCAVENGE SYSTEM

(71) Applicant: Textron Innovations Inc., Providence, RI (US)

(72) Inventors: Douglas Robert Mueller, Coppell, TX (US); Ivan Russell Laric, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 17/812,880

(22) Filed: Jul. 15, 2022

(51) Int. Cl.
| | | |
|---|---|---|
| F16H 57/04 | (2010.01) | |
| B64D 35/00 | (2006.01) | |
| B64C 29/00 | (2006.01) | |
| F01M 11/06 | (2006.01) | |
| F16K 11/076 | (2006.01) | |
| F01M 11/04 | (2006.01) | |

(52) U.S. Cl.
CPC ..... F16H 57/0435 (2013.01); B64C 29/0033 (2013.01); B64D 35/00 (2013.01); F01M 11/04 (2013.01); F01M 11/065 (2013.01); F16K 11/076 (2013.01); F16H 57/0436 (2013.01)

(58) Field of Classification Search
CPC .. F16N 27/02; F01M 11/0408; F01M 11/065; F01M 11/067; F01M 2011/068; F16K 11/076
See application file for complete search history.

(56) References Cited

U.S. PATENT DOCUMENTS

| | | | | |
|---|---|---|---|---|
| 1,870,068 | A * | 8/1932 | Roberts | F16N 27/02 184/29 |
| 2004/0148694 | A1* | 8/2004 | Brennan | F16K 11/085 4/541.1 |
| 2004/0238159 | A1* | 12/2004 | Humburg | B60H 1/08 165/41 |
| 2015/0083256 | A1* | 3/2015 | Weber | F16K 31/041 137/625.23 |
| 2016/0010536 | A1* | 1/2016 | Murakami | F01P 7/14 137/625.44 |
| 2017/0137122 | A1* | 5/2017 | Kooiman | B64C 29/0033 |
| 2017/0305566 | A1* | 10/2017 | Williams | F16H 57/021 |
| 2018/0051815 | A1* | 2/2018 | Murakami | F01P 7/14 |
| 2019/0072191 | A1* | 3/2019 | Shen | F16K 11/0876 |
| 2019/0316651 | A1* | 10/2019 | Prevot | F16F 9/05 |
| 2022/0243726 | A1* | 8/2022 | Tiprigan | F04C 2/102 |

* cited by examiner

*Primary Examiner* — Minh Truong
(74) *Attorney, Agent, or Firm* — Lightfoot & Alford PLLC

(57) ABSTRACT

A fluid pump system for an aircraft has a rotatable component having first and second fluid ports, each port in fluid communication with a selected interior portion of the component, the portions being spaced from each other. A valve controls allows a first flow rate through the first fluid port and allows a second flow rate through the second fluid port when the component is in a first angular orientation. The valve allows a third flow rate through the first fluid port and allows a fourth flow rate through the second fluid port when the component is in a second angular orientation.

16 Claims, 11 Drawing Sheets

FLUID SCAVENGE SYSTEM

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

CROSS-REFERENCE TO RELATED APPLICATIONS

Not applicable.

BACKGROUND

Rotorcraft drive systems can include various components that produce and transfer power. For example, engines and gearboxes are standard components. Such components generate heat and require lubrication. Excessive levels of heat can cause premature failure and create safety risks. Proper lubrication serves to reduce heat generation and assist in heat removal from moving components within gearboxes.

To provide proper lubrication, a pump is used to move oil within a system, and this includes transporting the oil within components or to and from external components, including heat exchangers and filters. During operation, the orientation of components and/or aircraft attitude and maneuvers may cause oil to move away from scavenge ports of the pump. In some tiltrotor gearboxes, a scavenge pump is always pumping a mixture of air and oil partly due to the orientation of the scavenge ports in the gearbox relative to its orientation. The mixture of air and oil requires additional equipment to remove the air and imposes additional design considerations for a lubrication system.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure provides a scavenge pump system that minimizes air mixing with oil being evacuated from a gearbox with a scavenge pump. In one embodiment configured for a tiltrotor, a pump is in a fixed orientation, and the gearbox and an outer pump housing rotate relative to the pump. The pump and outer housing each have ports that align based on the orientation of the gearbox for controlling the flow of oil and air by opening and closing selected ports of the pump. The system provides sufficient oil flow while minimizing the mixing of air into the scavenge lines.

Figure 1:
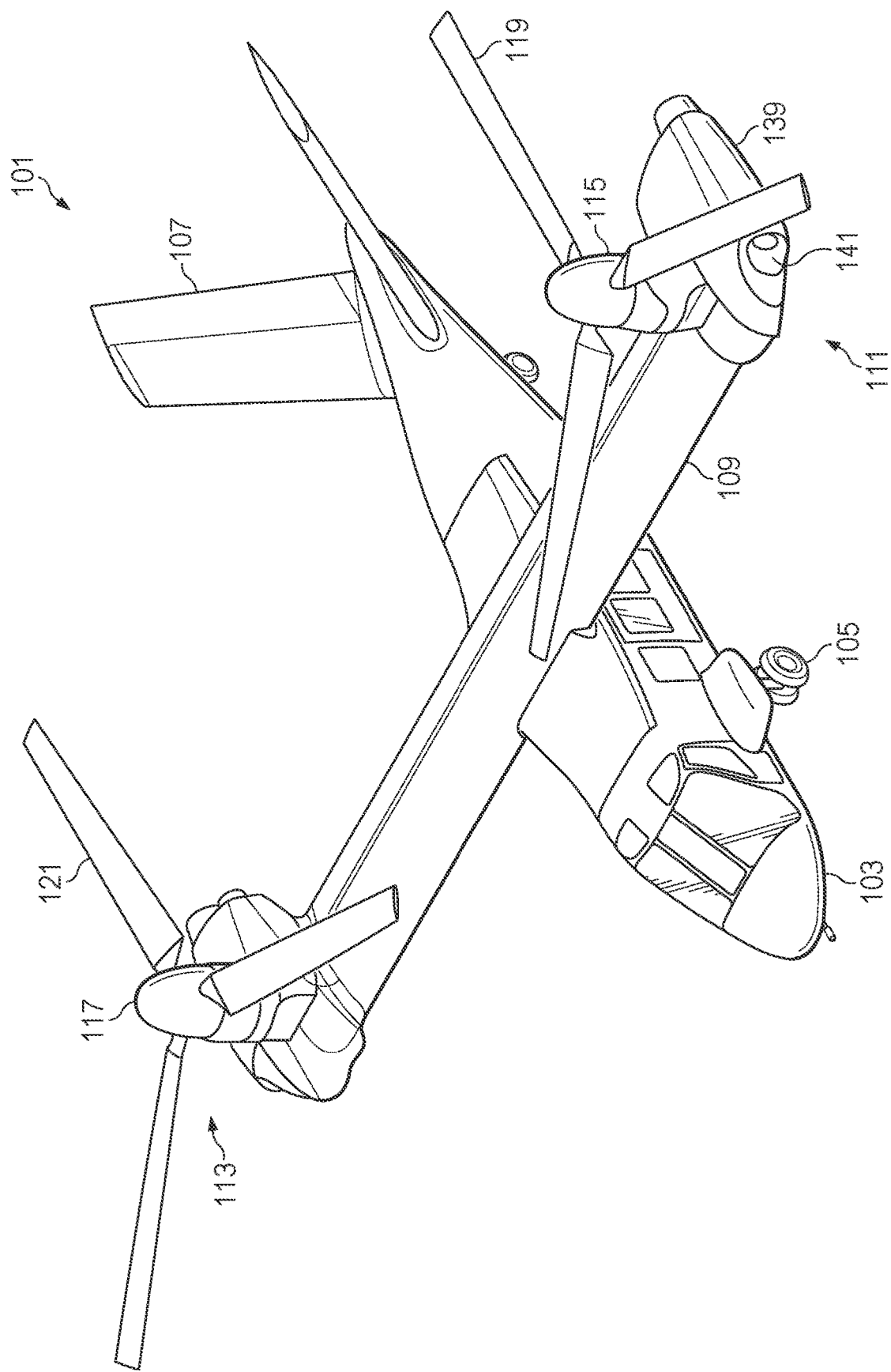
FIG. 1 is an oblique view of a tiltrotor aircraft according to this disclosure, the aircraft being shown in helicopter mode.
Figure 2:
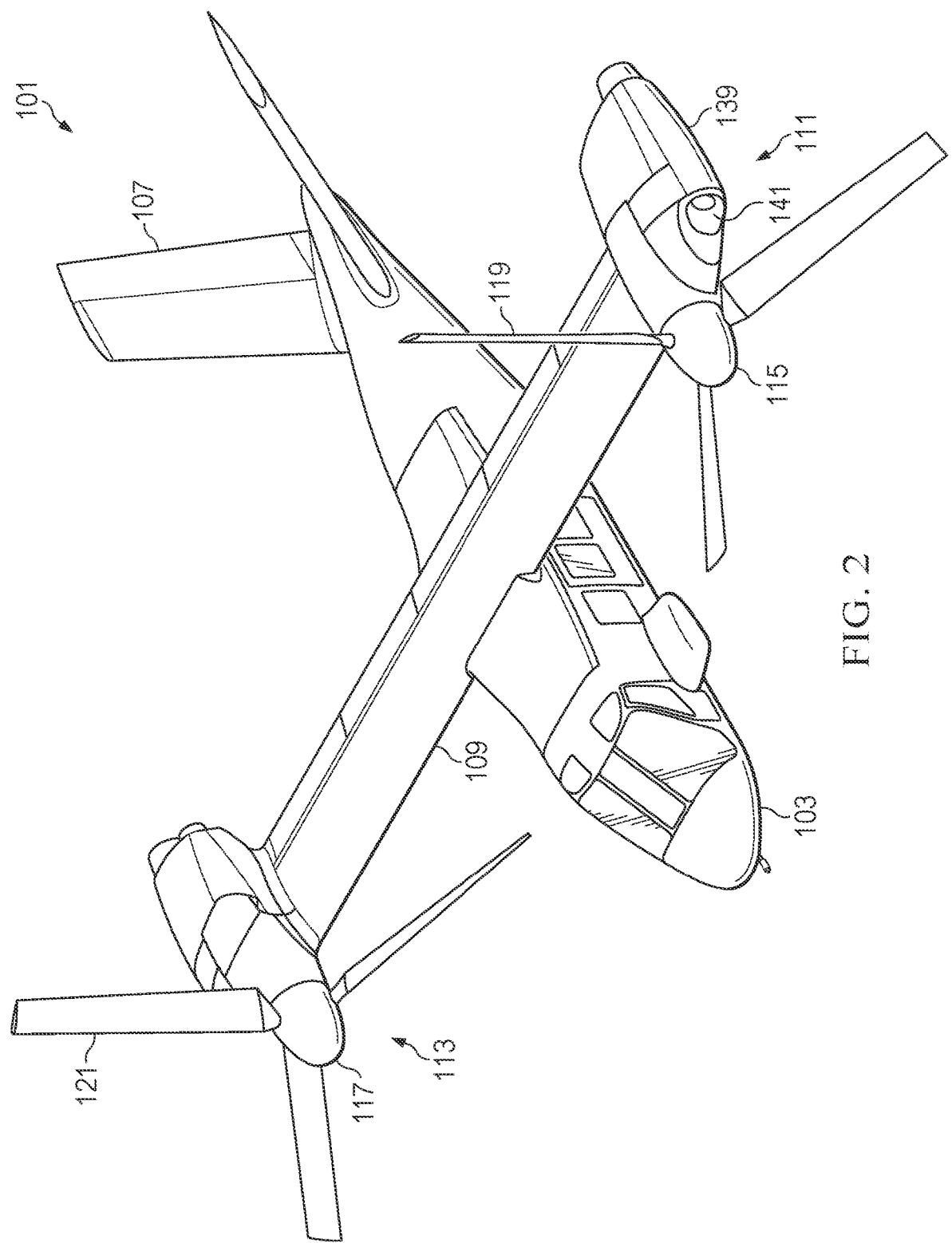
FIG. 2 is an oblique view of the aircraft of FIG. 1, the aircraft being shown in airplane mode.

FIGS. 1 and 2 in the drawings illustrate a tiltrotor aircraft 101 according to the disclosure. Aircraft 101 includes a fuselage 103, a landing gear 105, a tail member 107, a wing 109, a drive system 111, and a drive system 113. Each drive system 111 and 113 includes a fixed engine 139 and a rotatable proprotor 115 and 117, respectively. Each of rotatable proprotors 115 and 117 has a plurality of rotor blades 119 and 121, respectively, associated therewith. The position of proprotors 115 and 117, as well as the pitch of rotor blades 119 and 121, can be selectively controlled in order to selectively control direction, thrust, and lift of aircraft 101.

FIG. 1 illustrates aircraft 101 in helicopter mode, in which proprotors 115 and 117 are positioned substantially vertical to provide a lifting thrust. FIG. 2 illustrates aircraft 101 in an airplane mode in which proprotors 115 and 117 are positioned substantially horizontal to provide a forward thrust in which a lifting force is supplied by wing 109. It should be appreciated that aircraft 101 can be operated such that proprotors 115 and 117 are selectively positioned between airplane mode and helicopter mode, which can be referred to as a conversion mode.

The drive system 113 is substantially symmetric to the drive system 111; therefore, for sake of efficiency, certain features will be disclosed only with regard to drive system 111. However, one of ordinary skill in the art would fully appreciate an understanding of drive system 113 based upon the disclosure herein of drive system 111. Further, drive systems 111 and 113 are illustrated in the context of aircraft 101; however, drive systems 111 and 113 can be implemented on other tiltrotor aircraft. For example, an alternative embodiment may include a quad tiltrotor that has an additional wing member aft of wing 109; the additional wing member can have additional drive systems similar to drive systems 111 and 113. In another embodiment, drive systems 111 and 113 can be used with an unmanned version of aircraft 101. Further, drive systems 111 and 113 can be integrated into a variety of tiltrotor aircraft configurations.

Additionally, other drive systems are contemplated. For example, one example is a gearbox arrangement to provide torque to a rotor system of a helicopter.

Figure 3:
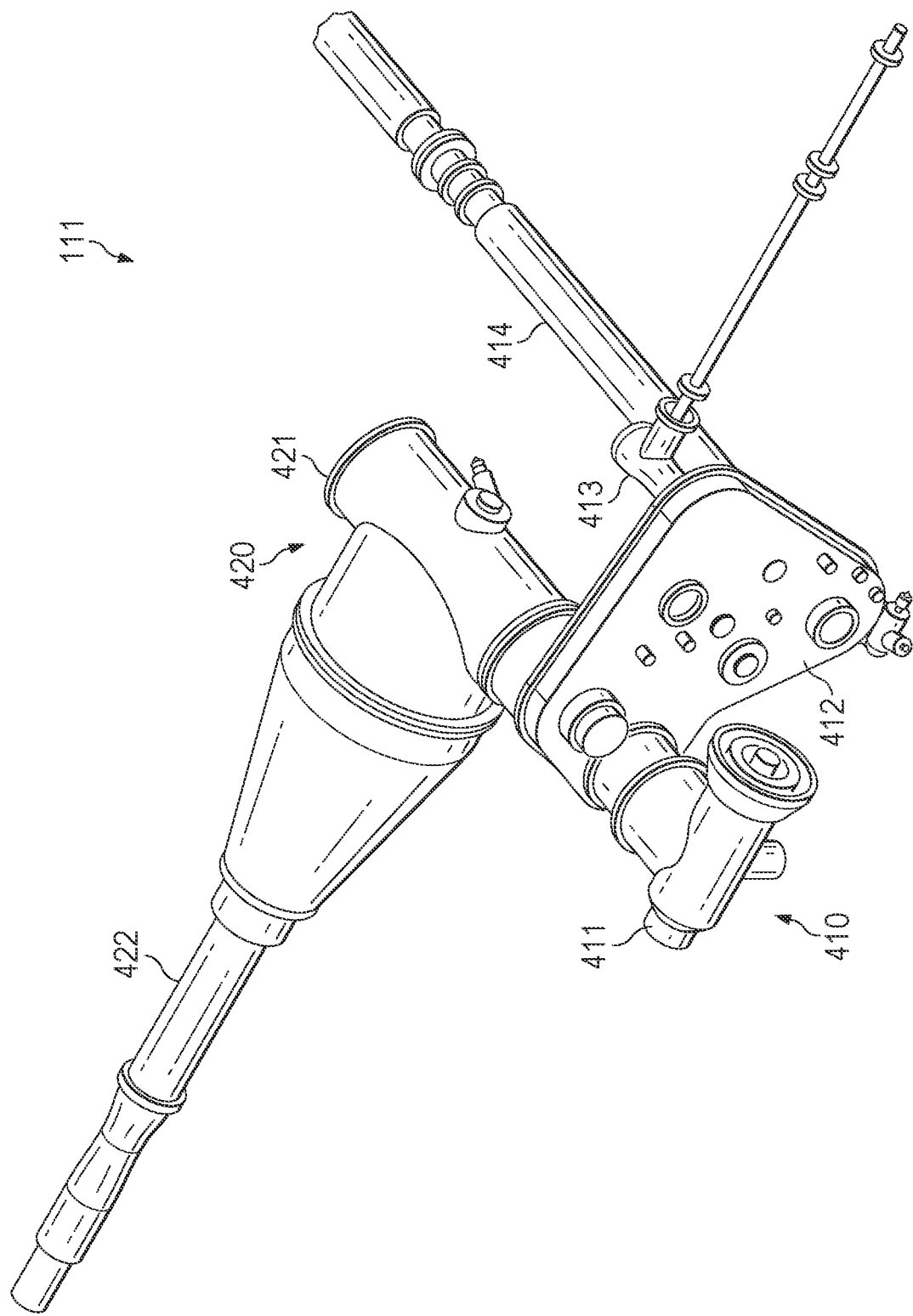
FIG. 3 is an oblique view of a drive system of an exemplary tiltrotor aircraft according to this disclosure.

FIG. 3 shows an oblique view of drive system 111, according to one example embodiment. Drive system 111 may include a first gearbox assembly 410 and a second gearbox assembly 420. First gearbox assembly 410 may include spiral bevel gearbox 411, interconnect gearbox 412, elbow gearbox 413, interconnect driveshaft 414, and engine 139 (not shown in FIG. 3). Second gearbox assembly 420 may include proprotor gearbox 421, and mast 422.

Engine 139 may be fixed relative to wing 109 of aircraft 101 and can provide torque via an engine output shaft to spiral bevel gearbox 411. Spiral bevel gearbox 411 can include spiral bevel gears to change torque direction by approximately ninety degrees from engine 139 to interconnect gearbox 412 via a clutch. Interconnect gearbox 412 can include a plurality of gears, such as helical gears, in a gear train that are coupled to interconnect driveshaft 414, elbow gearbox 413, and second gearbox assembly 420. The interconnect gearbox 412 can also be configured to provide power to various system accessories such as alternators, lube and scavenge pumps, hydraulic pumps, and generators.

Proprotor gearbox 421 includes a plurality of gears that are configured to transfer power and reduce rotational speed to mast 422. Elbow gearbox 413 is mounted to interconnect gearbox 412 and is configured to provide torque to the oil cooler blower fan, which draws in air for lubricant temperature reduction. Interconnect driveshaft 414 provides a torque path that enables a single engine to provide torque to both drive systems 111 and 113 in the event of a failure of one of the engines.

Gears, bearings, and other mechanical components of drive system 111 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces. A lubricant is a substance introduced to reduce friction between moving surfaces. Examples of lubricants include oil, biolubricants derived from plants and animals, synthetic oils, solid lubricants, and aqueous lubricants. Example transmission oils for proprotor gearbox 421 may include oils meeting specifications MIL-PRF-23699 (5 cSt), DOD-L-7808 (3-4 cSt), DOD-PRF-85734 (5 cSt), and other oils in the 9 cSt to 10 cSt viscosity range. Drive system 111 may include one or more lubrication systems to provide lubricant to the mechanical components of drive system 111.

Figure 4:
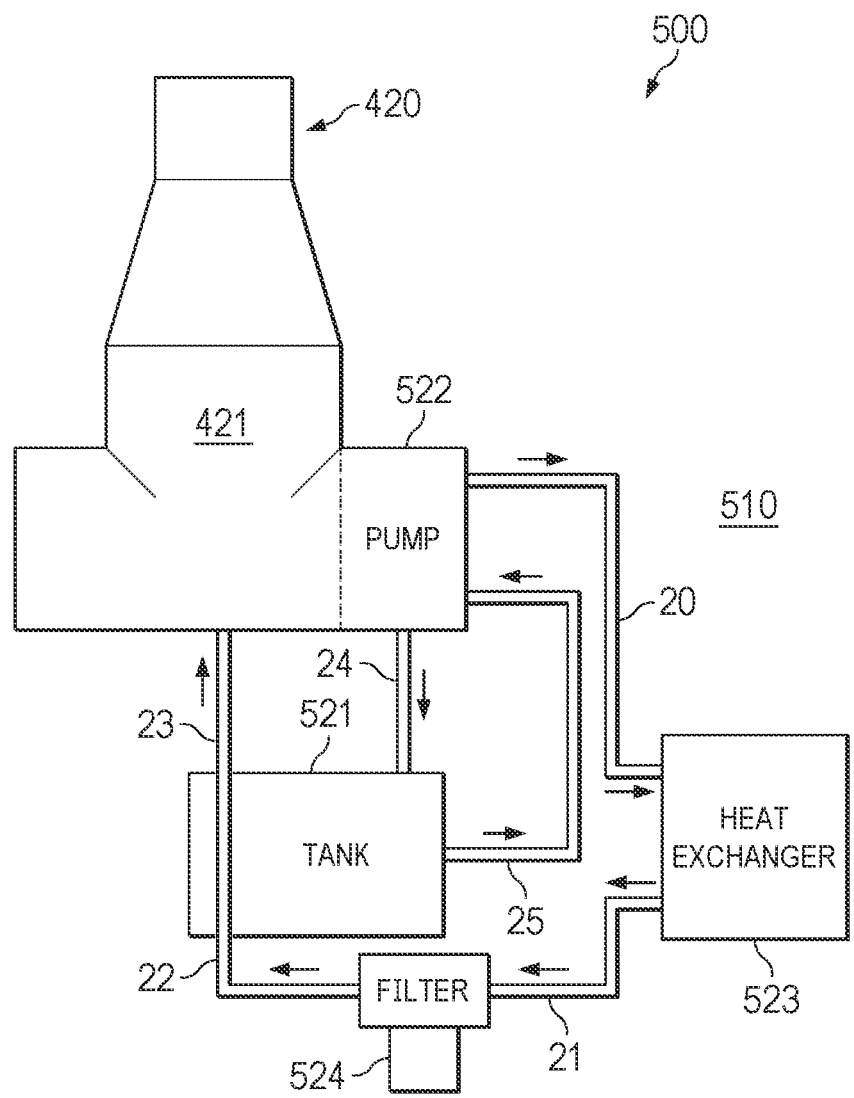
FIG. 4 is a schematic view of a lubrication system of an exemplary tiltrotor drive system according to this disclosure.

FIG. 4 illustrates a lubrication arrangement 500 that includes a lubrication system 510 providing lubricant to components of second gearbox assembly 420. System 510 includes a lubricant tank 521, a pump 522, a heat exchanger 523, a filter 524, and lubrication lines 20 through 25. System 510 may also include other components such as one or more sensors, pressure regulators, flowmeters, check valves, and jets.

Lubricant tank 521 represents reservoirs that store lubricant within system 510. Tank 521 may be integral with the housing of one of the gearboxes, such as proprotor gearbox 421, or separate from the housing of proprotor gearbox 421. Pump 522 represents devices that can be configured to circulate pressurized lubricant throughout primary lubrication system 510. Heat exchanger 523 represents devices configured to lower a temperature of the lubricant before the lubricant is applied to the various components that generate heat. Filter 524 represents devices configured to remove contaminants from the lubricant. Jets are configured to dispense lubricant on components of drive system 111 that are subject to friction and/or generate heat, such as gears and bearing.

Lubrication lines 20 through 25 represent fluid lines that connect various components of primary lubrication system 510. Lines 20 through 25 may comprise rigid pipelines, such as core passages in the housing of a gearbox, or flexible hoses, such as fluoropolymer tubing. The type of lubrication lines used may depend on the location of the line or expected fluid pressure within the line. Lines 20 through 25 may include other components such as swivels and quick disconnect couplings. In some examples, lines 20 through 25 may be collapsible in order to reduce residual lubricant during storage and when lubricant is not being flowed through the line.

As mentioned, lubrication lines 20 through 25 may fluidly connect various components of lubrication system 510. Lines 20 through 25 may fluidly connect components of primary system 510. For example, pump 522 may deliver lubricant from tank 521 to line 20, from line 20 to heat exchanger 523 where the lubricant is cooled. From heat exchanger 523, the lubricant may then be delivered to filter 524, via line 21, where particles may be removed from the lubricant. From filter 524, the lubricant may travel through line 22 to gearbox 421, bypassing tank 521 to regulate pressure.

Figure 5A:
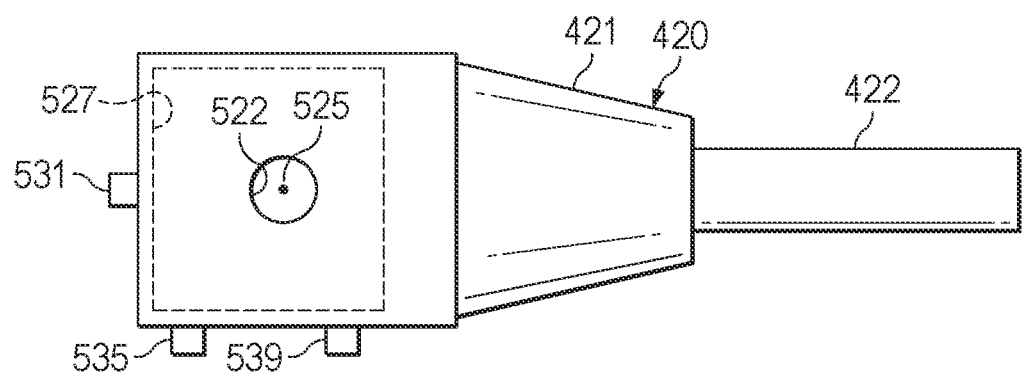
FIGS. 5A and 5B are schematic views of a pivoting gearbox of the drive system of FIG. 4, with FIG. 5A showing the gearbox in an airplane-mode orientation and FIG. 5B showing the gearbox in a helicopter-mode orientation.
Figure 5B:
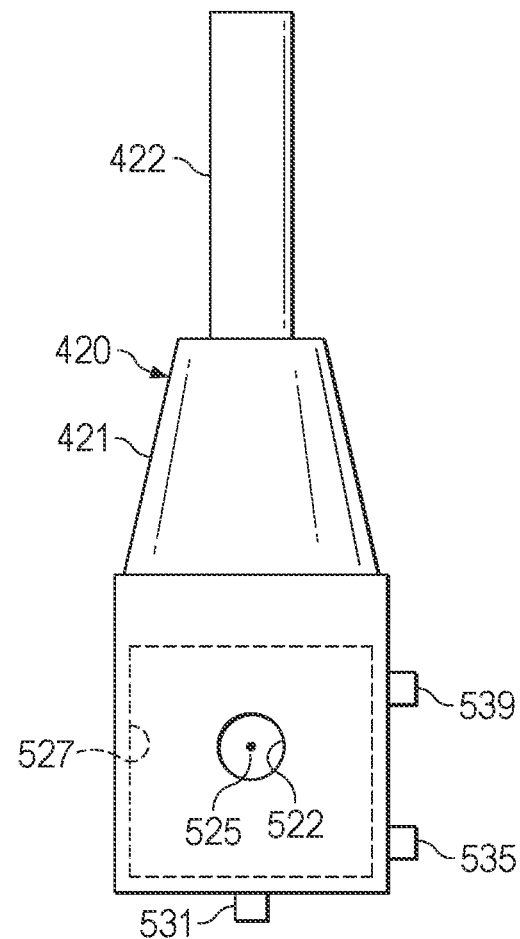

As shown in FIGS. 5A and 5B, gearbox assembly 420 is pivotable between a horizontal airplane-mode orientation, as shown in FIG. 5A, and a vertical helicopter-mode orientation, as shown in FIG. 5B, about axis 525 centered on pump 522. Proprotor gearbox 421 comprises an internal lubricant sump 527, and excess lubricant is free to move within sump 527 based on the force of gravity or forces generated during operation of aircraft 101.

Figure 6:
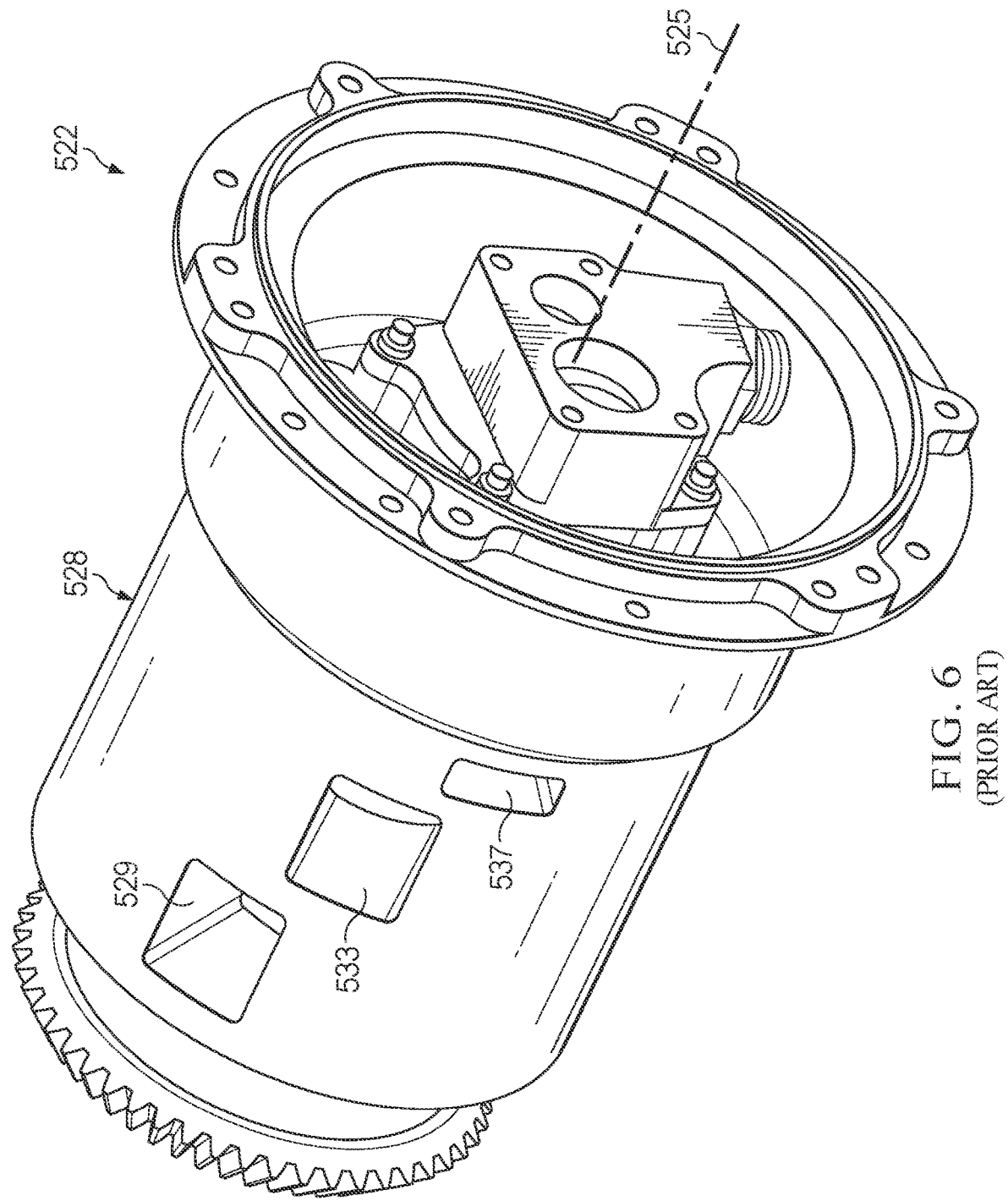
FIG. 6 is an oblique view of a prior-art lubricant pump for use in the lubrication system of FIG. 4.

Referring also to FIG. 6, a prior-art version of pump 522 has a pump housing 528 with ports in fluid communication with portions of sump 527 through an outer housing (not shown). Specifically, inner port 529 is in fluid communication with scavenge port 531, inner port 533 is in fluid communication with scavenge port 535, and inner port 537 is in fluid communication with scavenge port 539. Pump 522 mounts to and rotates with gearbox 421. Inner ports 529, 533, 537 of pump 522 are always in communication with scavenge ports 531, 535, 539, but this leads to air being drawn from at least one scavenge port 531, 535, 539. For example, when gearbox 421 is in airplane mode, as in FIG. 5A, lubricant pools in a lower portion of sump 527, meaning that lubricant is present at scavenge ports 535, 539, whereas air may be present at scavenge port 531. In helicopter mode, as in FIG. 5B, lubricant pools in a lower portion of sump 527, meaning that lubricant is present at scavenge port 531, whereas air may be present at scavenge ports 535, 539.

To minimize or prevent air from being drawn into a lubricant pump from a scavenge port, selective control of the fluid communication between the ports of the pump and the scavenge ports is needed. FIGS. 7-10 illustrate pump 601, which is configured to replace pump 522 and provide for selective control of which inner ports are open based on the rotational position of gearbox 421.

Pump 601 is constructed similarly to pump 522, but pump housing 603 of pump 601 serves as an inner component of a valve for controlling the opening of inner ports 605, 607, 609. Unlike pump 522, pump 601 does not rotate with gearbox 421. Instead, pump 601 is in a fixed orientation relative to the remainder of drive system 111. A flange 611 may be used to fixedly mount pump 601, and pump 601 may be affixed to a mounting bracket that is coupled to system 111 using existing structure and fastener locations. As visible in the figures, inner ports 605, 607 are elongated relative to ports 529, 533 of pump 522, and inner ports 605, 607, 609 are angularly spaced differently than ports 529, 533, 537. This spacing allows for inner ports 605, 607, 609 to be selectively opened based on the angular position of an outer housing 613 relative to pump housing 603.

Figure 7:
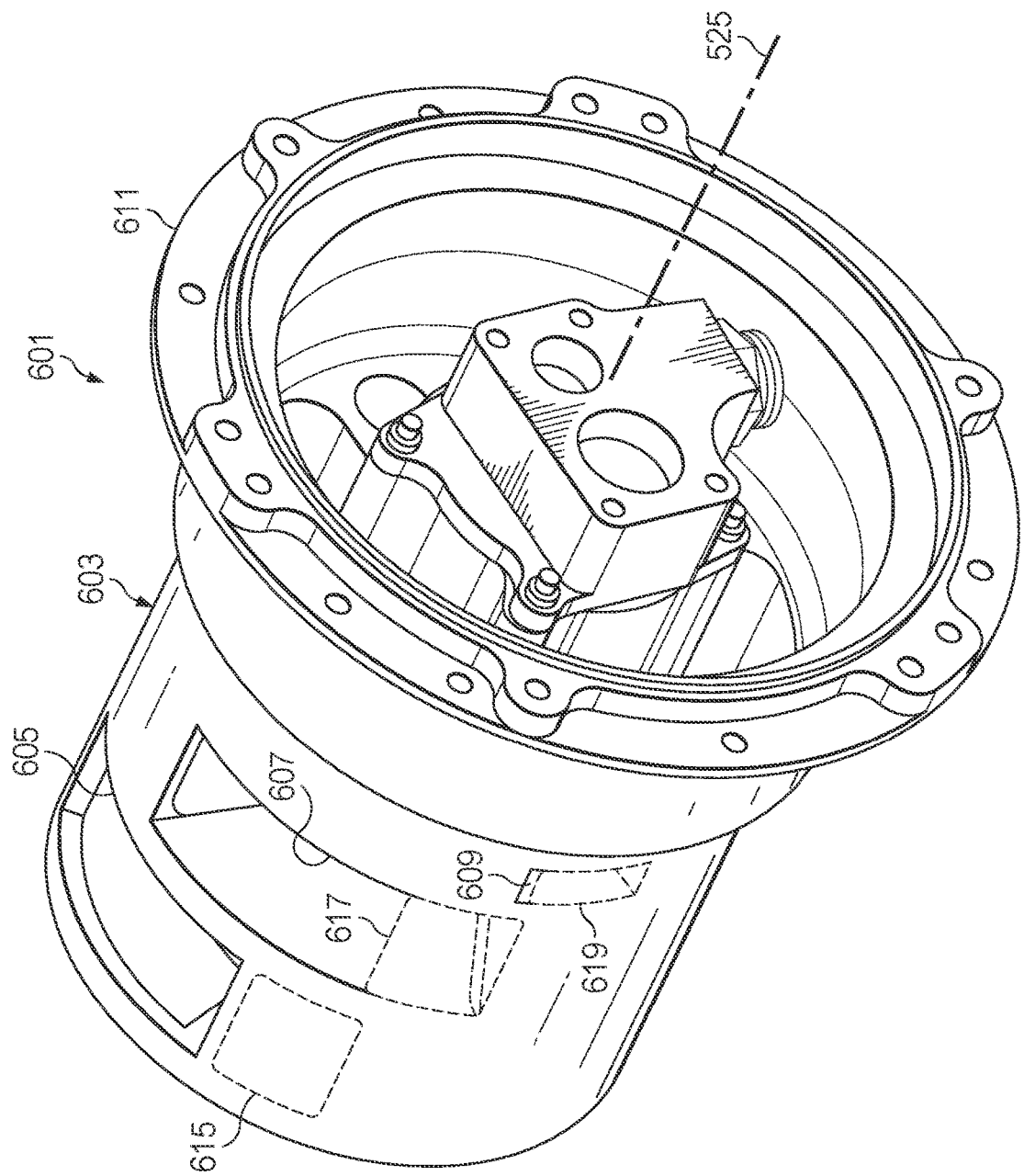
FIG. 7 is a front oblique view of a lubricant pump according to this disclosure and configured for use in the lubrication system of FIG. 4.
Figure 8:
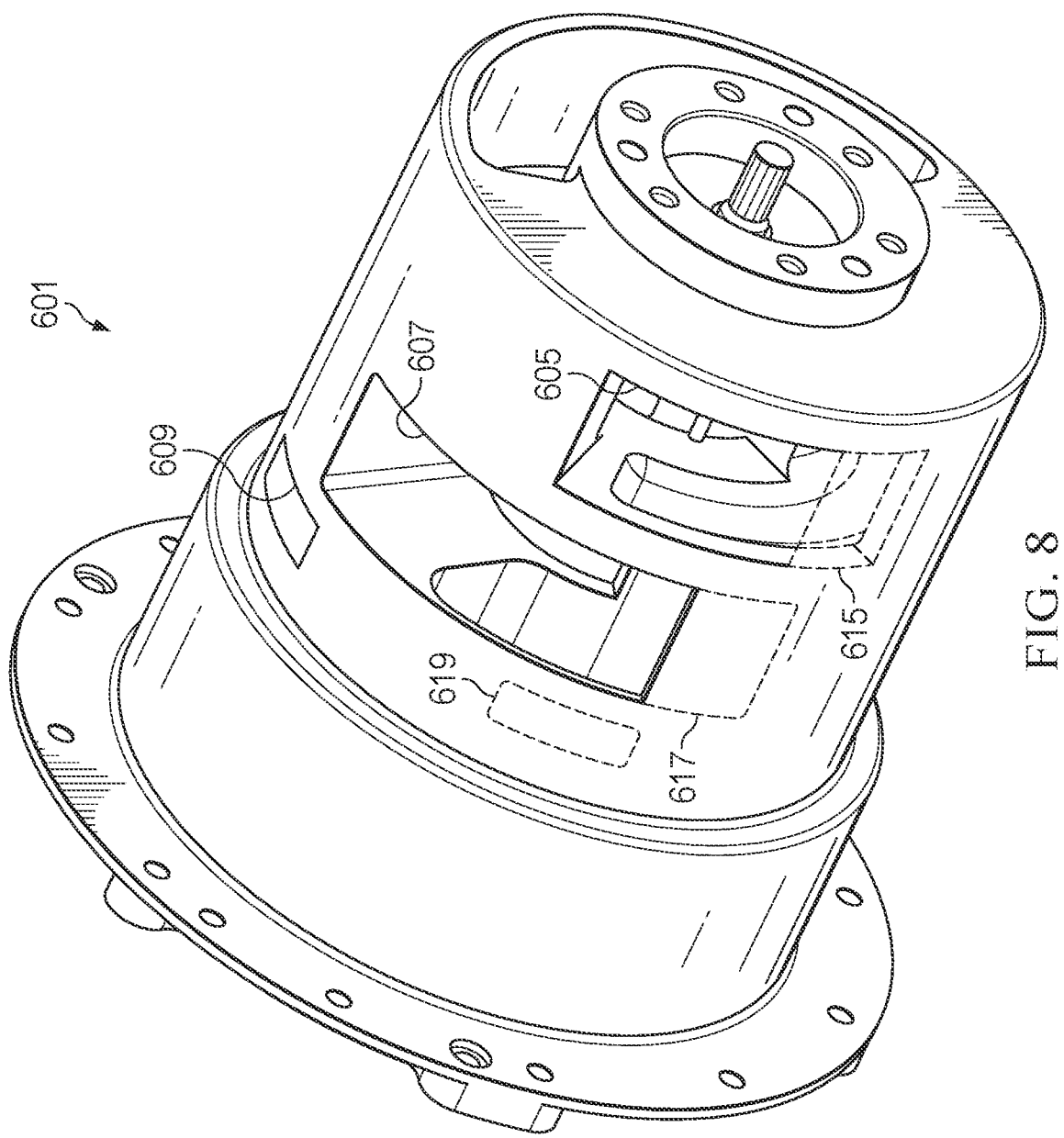
FIG. 8 is a rear oblique view of the lubricant pump of FIG. 7.
Figure 9:
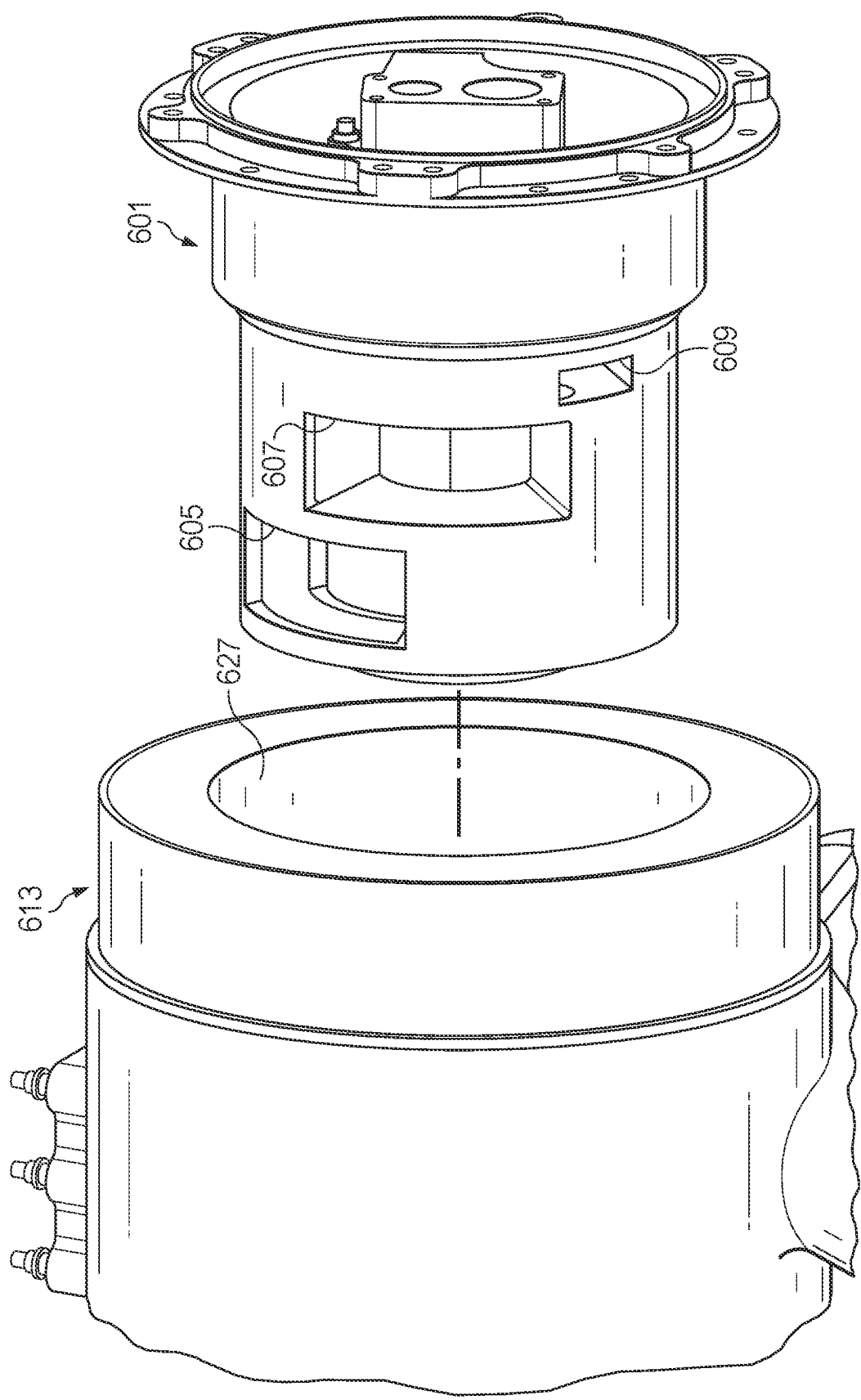
FIG. 9 is an oblique exploded view of the lubricant pump of FIG. 7 and an outer housing.
Figure 10:
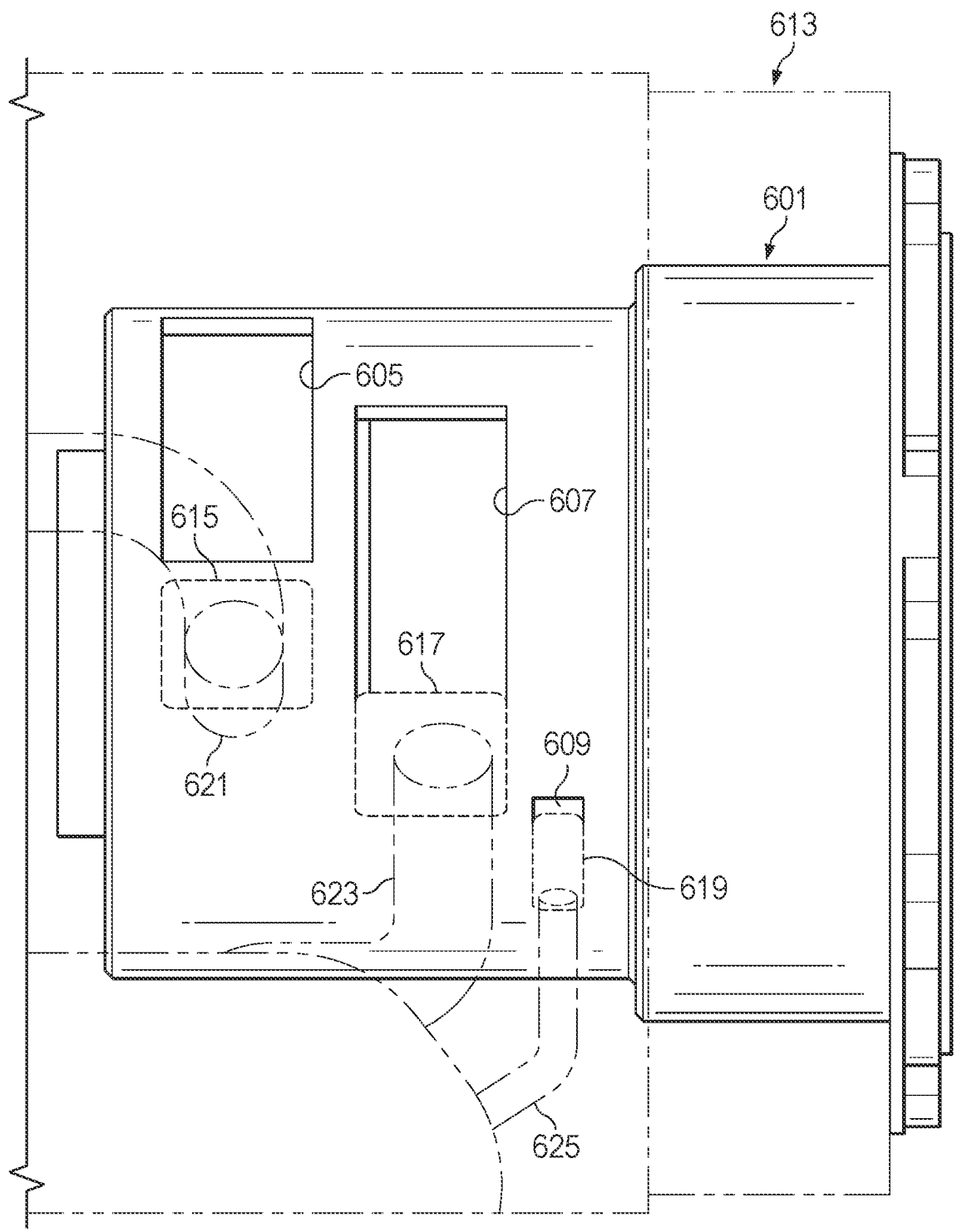
FIG. 10 is a side cutaway view of the lubricant pump of FIG. 7 installed in the outer housing.

As shown in FIGS. 9 and 10, outer housing 613 is carried by gearbox 421 for rotation therewith relative to pump 601. Outer housing 613 comprises outer ports 615, 617, 619, with outer port 615 being in fluid communication with scavenge ports 531 through passage 621, outer port 617 being in fluid communication with scavenge ports 535 through passage 623, and outer port 619 being in fluid communication with scavenge ports 539 through passage 625. Pump 601 is pivotably carried within a cavity 627 of outer housing 613 and oriented so that inner ports 605, 607, 609 of pump 601 are capable of fluid communication with selected outer ports 615, 617, 619 as gearbox 421 is rotated between the airplane-mode and helicopter-mode orientations. In FIG. 7, the positions of outer ports 615, 617, 619 are shown in broken lines at the positions corresponding to the airplane-mode orientation, whereas in FIG. 8 the positions of outer ports 615, 617, 619 are shown in broken lines at the positions corresponding to the helicopter-mode orientation.

In airplane mode, inner port 605 is closed and not in fluid communication with outer port 615 and scavenge port 531 of gearbox 421, whereas inner ports 607, 609 are open and in fluid communication with outer ports 617, 619 and scavenge ports 535, 539, respectively. In helicopter mode, inner port 605 is open and in fluid communication with outer port 615 and scavenge port 531 of gearbox 421, whereas inner ports 607, 609 are closed and not in fluid communication with outer ports 617, 619 and scavenge ports 535, 539.

The configuration of pump 601 allows for inner ports 605, 607, 609 to be fully open, partially open, or fully closed at different orientations of gearbox 421. Inner ports 605, 607, 609 may be configured to be partially closed when gearbox 421 is at a transition angle between the airplane-mode and helicopter mode orientations, as this can provide sufficient lubricant flow while blocking excess air from mixing into the scavenge lines.

Figure 11:
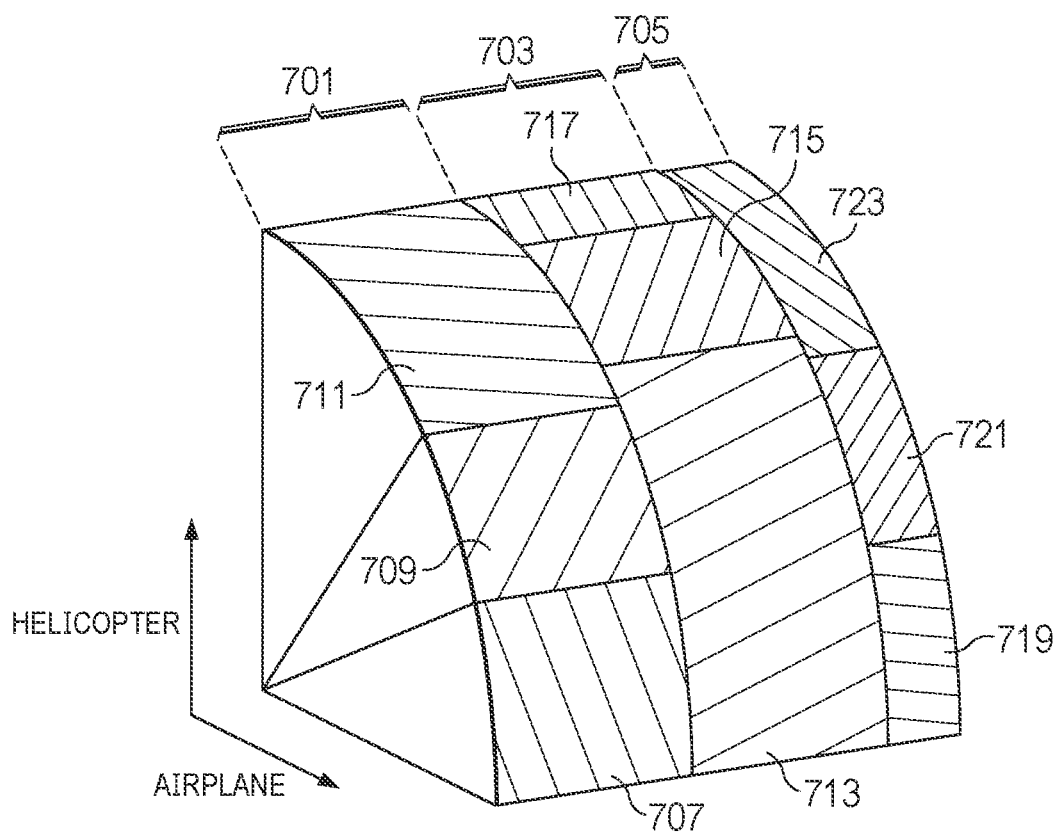
FIG. 11 is a representation of the state of inner ports of the pump of FIG. 7 relative to rotation angle of a gearbox.

FIG. 11 illustrates the amount which each inner port 605, 607, 609 is open throughout the 90-degree rotation of gearbox 421 relative to pump 601. Sections 701, 703, 705 show the state of inner ports 605, 607, 609, respectively. Inner port 605 is closed when gearbox 421 is in the airplane-mode orientation, as shown at portion 707, whereas port 605 is partially open when gearbox 421 is in a transition orientation, as shown at portion 709. Port 605 is open when as gearbox 421 moves toward the helicopter-mode orientation, as shown at portion 711. Likewise, inner port 607 is shown as open at portion 713, partially open at portion 715, and closed at portion 717, whereas inner port 609 is shown as open at portion 719, partially open at portion 721, and closed at portion 723.

Pump 601 provides for several advantages, including that swivels for pressure side connections would be eliminated. In addition, a scavenge swivel may have a reduced size, and an air line exiting the tank may also be reduced in size.

A fluid scavenge system has been described relative to a lubrication system of aircraft 101. It will be appreciated by those of skill in the art that fluid systems according to this disclosure may be used with other types of fluids, such as fuels, coolants, or other fluids, and with other types of aircraft, such as airplanes, helicopters, and the like. Though the system has been described as a scavenge system, this term should be understood to mean suction-pump systems of all types. In addition, the system may alternatively be configured to selectively control output from a pressure pump through the ports.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A fluid pump system for an aircraft, the system comprising:
 a gearbox component for a rotor, the component being pivotable between an airplane-mode orientation and a helicopter-mode orientation and having first and second fluid scavenge ports, each scavenge port in fluid communication with a selected interior portion of a fluid sump of the component for withdrawing fluid from the associated portion of the sump, the portions being spaced from each other; and
 a valve for controlling a flow rate of fluid through each scavenge port;
 wherein the valve allows a first flow rate through the first scavenge port and allows a second flow rate through the second scavenge port when the component is in a first angular orientation; and wherein the valve allows a third flow rate through the first scavenge port and allows a fourth flow rate through the second scavenge port when the component is in a second angular orientation.

2. The system of claim 1, wherein the valve comprises:
an inner housing having a first inner port and a second inner port; and
an outer housing having a first outer port in fluid communication with the first scavenge port and a second outer port in fluid communication with the second scavenge port;
wherein the inner and outer housings are capable of relative rotation, and one of the housings rotates together with the component.

3. The system of claim 2, wherein:
when the component is in the first orientation:
the first inner port and first outer port are in fluid communication; and
the second inner port and second outer port are not in fluid communication; and
when the component is in the second orientation:
the second inner port and second outer port are in fluid communication; and
the first inner port and first outer port are not in fluid communication.

4. The system of claim 2, wherein the inner housing has a third inner port and the outer housing has a third outer port in fluid communication with a third fluid port of the component.

5. The system of claim 4, wherein:
when the component is in a selected orientation, the third inner port and third outer port are in fluid communication.

6. The system of claim 1, wherein the valve allows for flow through both scavenge ports when the component is in an intermediate angular orientation between the first and second orientations.

7. The system of claim 1, wherein at least one of the flow rates is zero.

8. A fluid scavenge system for an aircraft, the system comprising:
a gearbox component for a rotor, the component being pivotable between an airplane-mode orientation and a helicopter-mode orientation and having a sump therein configured for retaining a volume of fluid;
first and second scavenge ports, each port in fluid communication with a selected portion of the sump for withdrawing fluid from the associated portion of the sump, the portions being spaced from each other; and
a valve for controlling a flow of fluid through each scavenge port;
wherein the valve allows flow through the first scavenge port and prevents flow through the second scavenge port when the component is in a first orientation; and
wherein the valve prevents flow through the first scavenge port and allows flow through the second scavenge port when the component is in a second orientation.

9. The system of claim 8, wherein the valve comprises:
an inner housing having a first inner port and a second inner port; and
an outer housing having a first outer port in fluid communication with the first scavenge port and a second outer port in fluid communication with the second scavenge port;
wherein the inner and outer housings are capable of relative rotation;

wherein, when the component is in the first orientation:
the first inner port and first outer port are in fluid communication; and
the second inner port and second outer port are not in fluid communication; and
wherein, when the component is in the second orientation:
the second inner port and second outer port are in fluid communication; and
the first inner port and first outer port are not in fluid communication.

10. The system of claim 9, wherein the inner housing has a third inner port and the outer housing has a third outer port in fluid communication with a third scavenge port;
wherein, when the component is in a selected orientation, the third inner port and third outer port are in fluid communication.

11. The system of claim 8, wherein the valve allows for flow through both fluid ports when the component is in an intermediate angular orientation between the first and second orientations.

12. A lubricant scavenge system for a gearbox of a tiltrotor aircraft, the gearbox being pivotable between an airplane-mode orientation and a helicopter-mode orientation and having a fluid sump therein, the system comprising:
first and second scavenge ports, each port in fluid communication with a selected portion of the sump for withdrawing fluid from the associated portion of the sump, the portions being spaced from each other; and
a valve for controlling a flow of fluid through each scavenge port;
wherein the valve allows a first flow rate through the first scavenge port and allows a second flow rate through the second scavenge port when the gearbox is in a first angular orientation; and
wherein the valve allows a third flow rate through the first scavenge port and allows a fourth flow rate through the second scavenge port when the gearbox is in a second angular orientation.

13. The system of claim 12, wherein the valve comprises:
an inner housing having a first inner port and a second inner port; and
an outer housing having a first outer port in fluid communication with the first scavenge port and a second outer port in fluid communication with the second scavenge port;
wherein the inner and outer housings are capable of relative rotation.

14. The system of claim 13, wherein:
when the gearbox is in the first orientation:
the first inner port and first outer port are in fluid communication; and
the second inner port and second outer port are not in fluid communication; and
when the gearbox is in the second orientation:
the second inner port and second outer port are in fluid communication; and
the first inner port and first outer port are not in fluid communication.

15. The system of claim 13, wherein the inner housing has a third inner port and the outer housing has a third outer port in fluid communication with a third scavenge port,
wherein, when the gearbox is in a selected orientation, the third inner port and third outer port are in fluid communication.

16. The system of claim 12, wherein the valve allows for flow through both fluid ports when the gearbox is in an intermediate angular orientation between the first and second orientations.

* * * * *